United States Patent [19]

Brown et al.

[11] Patent Number: 5,524,047

[45] Date of Patent: * Jun. 4, 1996

[54] METHOD AND APPARATUS FOR EMULATING TELEPHONIC COMMUNICATIONS WITH A MODEM AND HEADSET

[75] Inventors: Paul M. Brown, Morgan Hill; Shahin Hedayat, San Ramon; George V. Urbani, Morgan Hill, all of Calif.

[73] Assignee: Cirrus Logic, Inc., Fremont, Calif.

[ * ] Notice: The portion of the term of this patent subsequent to Sep. 15, 2013, has been disclaimed.

[21] Appl. No.: 173,761

[22] Filed: Dec. 27, 1993

Related U.S. Application Data

[63] Continuation-in-part of Ser. No. 121,615, Sep. 15, 1993.

[51] Int. Cl.$^6$ .......................... H04M 11/00; H04M 1/64; H04M 1/00

[52] U.S. Cl. .............. 379/93; 379/88; 379/100; 379/58; 379/59; 379/98; 379/442

[58] Field of Search ................................ 379/93, 94, 96, 379/97, 98, 99, 100, 88, 89, 39, 40, 442, 443, 444, 58, 59, 90, 441, 388, 389, 390, 395, 416, 265, 266, 348; 375/222

[56] References Cited

U.S. PATENT DOCUMENTS

| | | | |
|---|---|---|---|
| 4,800,439 | 1/1989 | Yoshino | 379/100 |
| 4,991,197 | 2/1991 | Morris | 379/58 |
| 5,036,513 | 7/1991 | Greenblatt | 379/93 |
| 5,058,155 | 10/1991 | Larsen | 379/442 |
| 5,283,819 | 2/1994 | Glick et al. | 379/90 |

FOREIGN PATENT DOCUMENTS

| | | | |
|---|---|---|---|
| 2907361 | 8/1980 | Germany | 379/416 |
| 0116023 | 5/1987 | Japan | 379/390 |

OTHER PUBLICATIONS

FAXMODEMS, Rockwell International, pp. 18–19.
RC224ATF, Single Device Data/Fax Modem with "AT" Commands; Rockwell International, p. 2.
R96DFX 9600 bps MONOFAX® Modem with Error Detection and DTMF Reception, Rockwell International, Document No. 29200N60, Order No. MD60, Rev. 1, Nov. 1990.
9600 bps MONOFAX® Modem Designer's Guide; Rockwell International, Digital Communications Division, Order No. 820, Rev. 2, Dec. 1991.

*Primary Examiner*—Jason Chan
*Attorney, Agent, or Firm*—Blakely, Sokoloff, Taylor & Zafman

[57] ABSTRACT

An emulator circuit is provided for allowing a data/fax/voice modem, a host computer, and a telephone headset to emulate the functions of a telephone. For voice communications, the emulator circuit connects the telephone headset to a communication device such as a telephone line or cellular radio. For automated data/fax/voice communications, the emulator circuit connects the modem to the communication device. Two specific embodiments of the emulator circuit are described. In one, the emulator circuit is configured from analog circuit components connected to the modem. In the other, the emulator circuit is an integrated circuit component of the modem. In both embodiments, the provision of the emulator circuit obviates the need to provide a separate telephone for handling voice telephone conversations and other communications through said telephone line, cellular radio. An embodiment is also described wherein an emulator circuit is connected to either a telephone line or a cellular radio or other communication device. A switch is provided for selecting between the telephone line and the cellular radio.

21 Claims, 11 Drawing Sheets

METHOD AND APPARATUS FOR EMULATING TELEPHONIC COMMUNICATIONS WITH A MODEM AND HEADSET

RELATED APPLICATION

This application is a Continuation-in-part of U.S. patent application Ser. No. 08/121,615, filed Sep. 15, 1993, for "METHOD AND APPARATUS FOR EMULATING A TELEPHONE WITH A MODEM AND HEADSET".

BACKGROUND OF THE INVENTION

1. Field of the Invention

The invention generally relates to modems and communication devices, and more particularly relates to a device for emulating telephone functions using a modem, a host computer, and a headset having a microphone and earphones. The communication device may be a telephone, cellular radio or any other communication device using visible light, infrared, ultraviolet, radio or acoustic waves.

2. Description of Related Art

Modems are commonly employed for allowing a host computer to input and output data to other devices through a telephone line connected to the public switched telephone network (PSTN). Traditionally, modems allowed for only data communication in the form of encoded data or facsimile data. To allow for ordinary, voice telephone calls, a separate telephone is needed for direct connection into the PSTN.

More recently modems have been developed which incorporate voice telephonic features. One such device is a data/fax/voice modem. The data/fax/voice modem automatically answers an incoming telephone call received along a telephone line connected to the PSTN. The data/fax/voice modem then determines whether the received telephone call includes a data message, a facsimile message, or an ordinary voice message. If the incoming message is a data message, a data modem module of the data/fax/voice modem operates to receive and decode the data message for storage in a computer memory of a host computer such as a hard disk drive. If the incoming message is a facsimile message, a fax module of the data/fax/voice modem operates to receive and decode the facsimile image for storage within the memory of the host computer. Alternatively, a facsimile print-out device may be connected to the data/fax/voice modem for automatically printing the facsimile image, thus eliminating the need to store the facsimile image within the host computer. If the incoming message is a voice message, an answering machine module of the data/fax/voice modem operates to answer the incoming voice communication. Initially, the answering machine module of the data/fax/voice modem outputs a prerecorded greeting, then records a voice message in response to the greeting. A digital-to-analog converter means is typically included within the data/fax/voice modem for converting the incoming voice message to digital signals for storing in the memory of the host computer. Alternatively, the data/fax/voice modem may be connected to a conventional analog recording device, such as a tape recorder for recording the voice message. As can be appreciated, a variety of implementations and configurations are available.

To allow an operator to listen to received voice messages and to record the answering machine greeting, a telephone headset is typically provided. The telephone headset, which includes an earphone and a microphone, is connected directly into the modem. However, no capability is provided for receiving or placing a voice telephone call using just the headset, modem and host computer. To be able to place telephone calls or to converse directly with a calling party, a separate telephone is required for connection to the PSTN line.

FIG. 1 illustrates a set-up wherein a telephone is provided in combination with a modem. More specifically, FIG. 1 illustrates a set-up having a modem 10, a host computer 12, a telephone headset 14, and a separate telephone 16. As can be seen, telephone 16 is directly connected to a telephone line 18 interconnecting the PSTN and modem 10. In some systems, telephone 16 is directly connected into modem 10. However, even in such systems, internal circuitry bypasses the modem operations to provide only a direct interconnection between telephone 16 and telephone line 18.

Although the setup of FIG. 1 provides for both placing and receiving voice telephone messages, the setup is not ideal. For example, undesirable redundancy results from a need to provide both a complete telephone 16 and a separate telephonic headset 14. In particular, two sets of speaker and microphone mechanisms are required, one on the headset and one on the telephone. Moreover, much of the functionality of the telephone, including call initiation, dialing, repertory dialing and call answering, are duplicated within the modem and the telephone. Another disadvantage is that a large bulky telephone is required to conduct ordinary voice communications. Carrying such a large telephone may not be practical, especially for portable applications. Moreover, the physical size of a standard module telephone jack is difficult to incorporate into small form-factor modems and other devices. To avoid these and other disadvantages, it would be desirable to provide a mechanism which would allow modem 10, host computer 12 and headset 14 to emulate the telephone, thereby eliminating the need to provide a separate telephone.

Similar disadvantages occur with other communications devices, besides modems, such as facsimile machines and personal digital assistant systems (PDA's).

Non-land-line based communication media have been employed for transmitting telephonic communications. Examples include cellular radio and related devices. Other examples include non-hard-wired local area networks (LAN's) which may employ radio or infrared signaling. The above-described disadvantages in conventional modems can occur in non-land-line based devices and are not limited solely to land based telephone lines or to the PSTN telephone network.

SUMMARY OF THE INVENTION

The present invention is drawn to a method and apparatus for emulating a telephone, using a modem, a telephone headset, and a host computer.

In accordance with one embodiment, the invention provides an apparatus, connected to a communication device such as a cellular radio, having: a modem means for receiving information from, and for transmitting information, to the communication device and acoustic transducer means, such as a microphone/earphone set, for receiving and producing sounds. Connection means are provided for connecting the modem means to the communication device for processing automated communications and selectively connecting the acoustic transducer means to the communication device for non-automated voice communications. Automated communications include data, fax, and automaticallyanswered voice communications. Non-automated communications include voice conversations. In general, the communication device may employ any form of signal transmission media, excluding radio, infrared, ultraviolet, acoustic waves, as well as land lines.

In a preferred embodiment, the modem means is a data/fax/voice modem and the acoustic transducer means is a telephone headset having a microphone and an earphone. The connection means connects the modem to the communication device if the message is a data message and connects either the modem or the telephone headset to the communication device if the message is a voice message. In this manner, the incoming voice messages are either automatically processed by a voice module of the data/fax/voice modem or connected directly to the telephone headset for direct conversation.

Also, in the preferred embodiment, the modem has receive, transmit and microphone terminals. The connection means includes means for connecting the receive and transmit terminals of the modem to the communication device. An earphone connection means is also included for connecting the earphone to the transmit terminal of the modem and for selectively connecting the earphone to the receive terminal of the modem. A microphone connection means is included for connecting the microphone to the microphone input of the modem.

Alternative embodiments of the connection means are provided in accordance with the invention. In one embodiment, analog circuit components interconnect the earphone and microphone of the headset with the modem and with the receive and transmit lines. In a second embodiment, the modem includes components for connecting the earphone and microphone of the headset to the receive and transmit lines and to the digital signal processor. In the second embodiment, appropriate analog-to-digital and digital-to-analog conversion means are provided for converting both voice-based and data-based messages to and from a digital format. In particular, a voice picked up by the microphone is converted to a digital signal, processed by the digital signal processor, then converted to an analog signal for output on the transmit line to the communication device. In this manner, digital signal processing techniques may be employed to scale or otherwise modify the outgoing voice signal.

As noted, the communication device may be, for example, a telephone line or a cellular radio. In one embodiment of the invention, first and second communication devices are provided. A switching means is also provided for connecting either the first or the second communication device to the connection means. The first communication device may be a cellular radio and the second communication device may be a telephone line. In this manner, the modem and microphone/earphone set are selectively connected to either the cellular radio or the telephone line.

In its various embodiments,-the invention provides an apparatus for allowing a host computer, a modem means, and a telephone headset to emulate a telephone, such that a separate telephone is not required. The modem means is preferably a data/fax/voice modem. However, the modem means need not be only a modem, but may be any of a variety of telecommunication devices, such as PDA's, facsimile machines, which are capable of receiving and transmitting information to a communication device, such as a cellular radio, or directly onto any form of communications media, such as radio, infrared, ultraviolet, or acoustic waves. In its various embodiments, both incoming and outgoing telephone calls, as well as automated data communications, are fully and conveniently handled. Other features, advantages and objects of the invention will be set forth below.

DETAILED DESCRIPTION OF THE INVENTION

Figure 7:
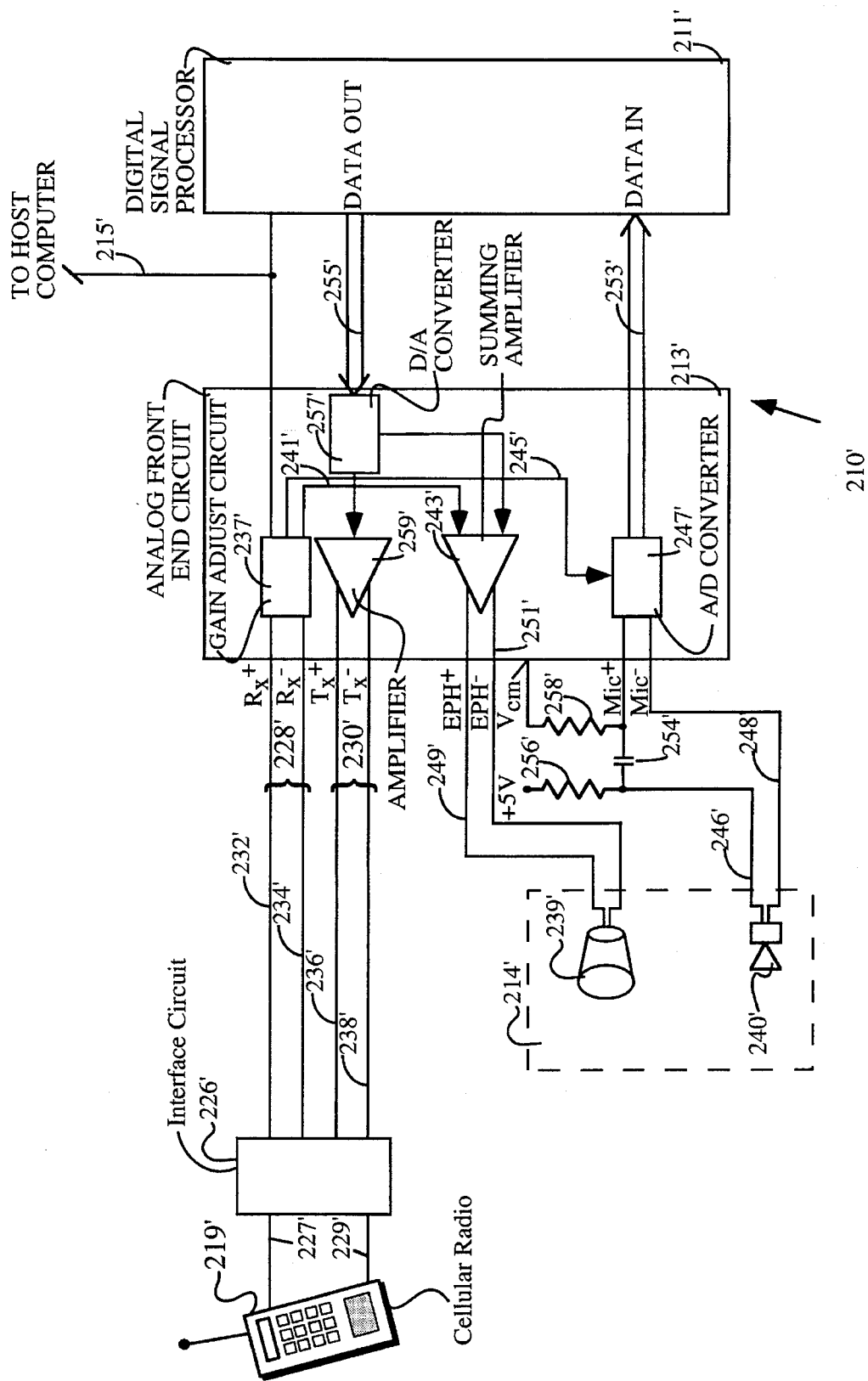
FIG. 7 is a block diagram, partially in schematic form, of an embodiment of FIG. 5, wherein the emulator circuit includes a digital signal processor.
Figure 8:
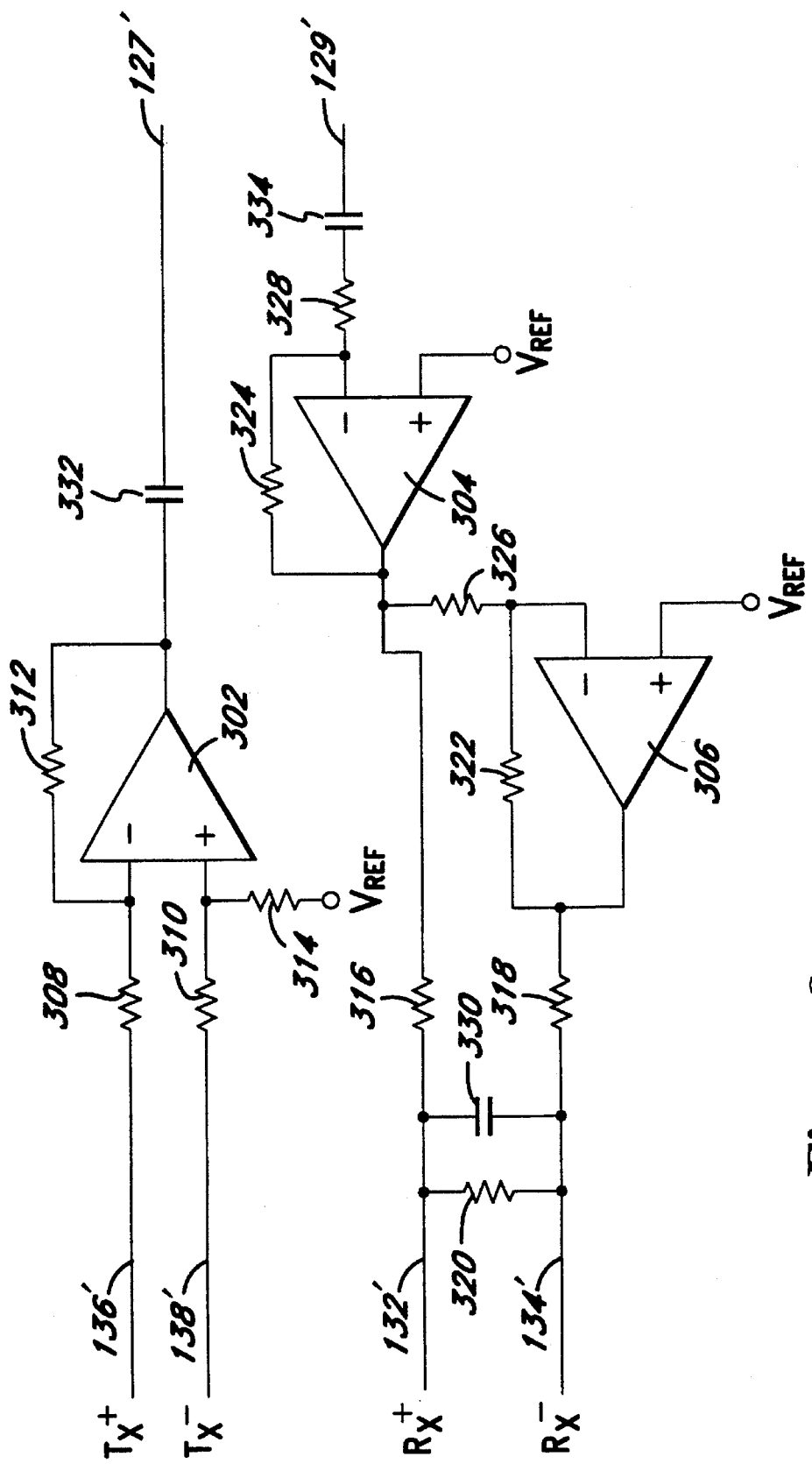
FIG. 8 is a schematic diagram of an interface circuit appropriate for use in the embodiments of FIGS. 6 and 7.
Figure 9:
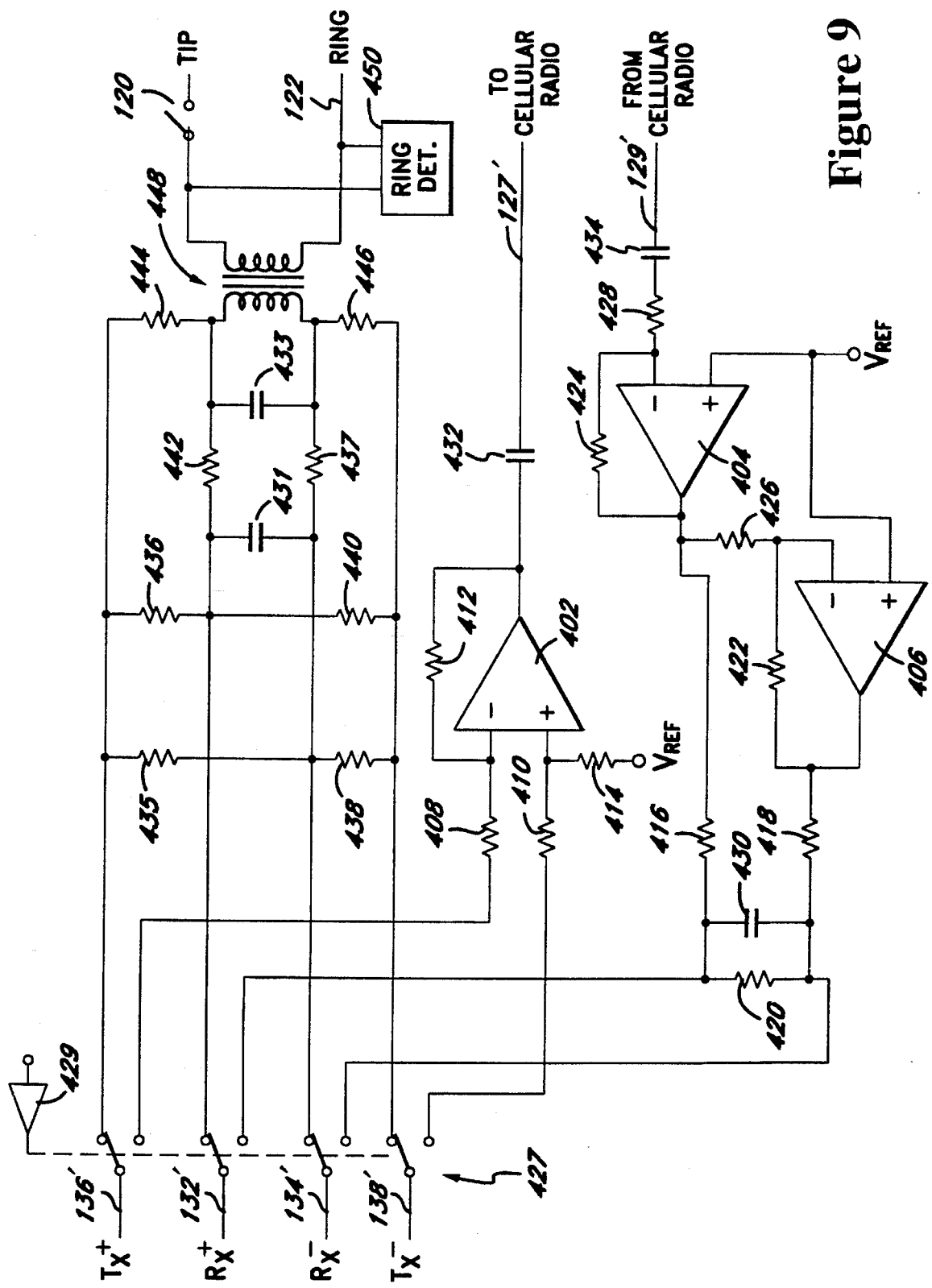
FIG. 9 is a schematic diagram of an alternative embodiment of the interface circuit of FIG. 8 which allows the system to be selectively connected to either a telephone line or a cellular radio.

Referring to FIGS. 2–9, preferred embodiments of the invention will now be described. FIGS. 2–4c illustrate a system having a data/fax/voice modem, a host computer, a telephone headset, and a telephone emulator circuit connected to a telephone line. FIGS. 5–8 illustrate embodiments of the invention connected to a non-land line based communication device, specifically a cellular radio. FIG. 9 illustrates an embodiment which connects to enter a telephone line or a cellular radio.

Figure 1:
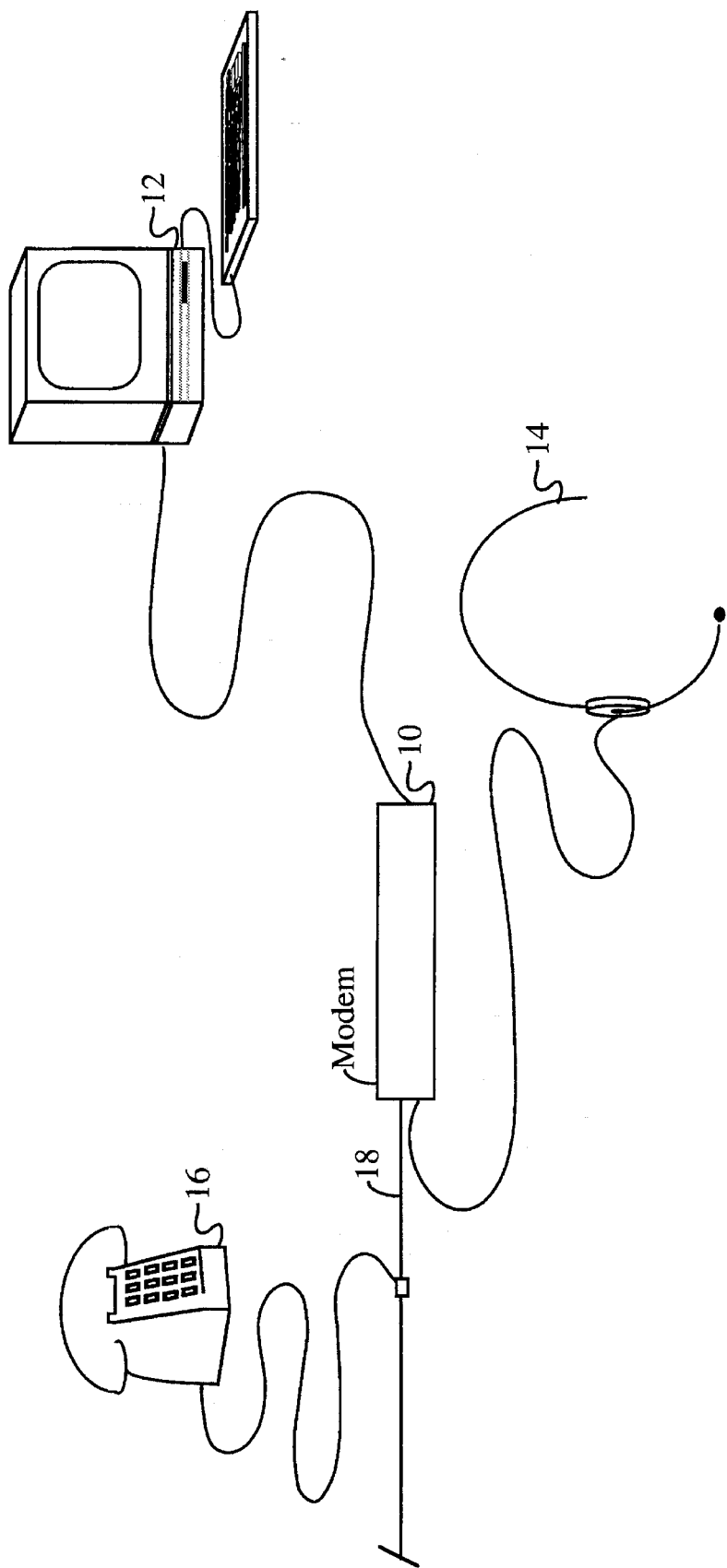
FIG. 1 is a block diagram illustrating a prior art system employing a host computer, a modem, a telephone headset and a separate telephone.
Figure 2:
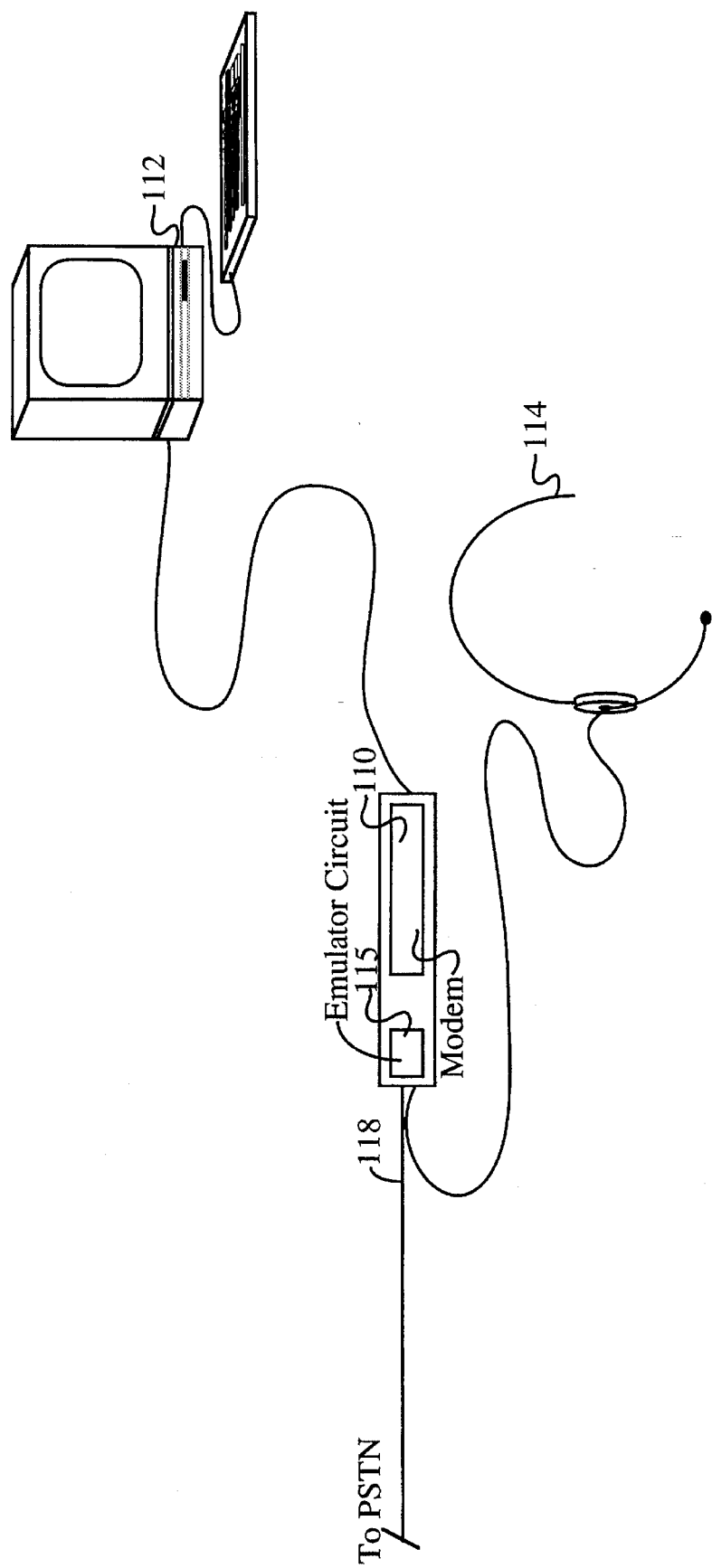
FIG. 2 is a block diagram illustrating an embodiment of the invention wherein a system is provided with a modem, a host computer, a telephone headset and an emulator circuit for enabling the system to emulate the functions of a telephone while connected to a telephone land line.

More specifically, FIG. 2 provides a high level block diagram of a system having a data/fax/voice modem 110, a host computer 112, a telephone headset 114, a telephone emulator circuit 115 and a telephone line 118 connected to a PSTN is illustrated. Emulator circuit 115, in connection with a properly programmed host computer 112, provides a connection means which allows modem 110 and headset 114 to emulate the functions of the telephone, eliminating the need to provide a separate telephone, such as telephone 16 of FIG. 1. When placing a voice telephone call, emulator circuit 115 connects headset 114 to line 118. The telephone number to be called, entered using computer 112, is dialed by modem 110. For an incoming voice telephone call, emulator circuit 115 connects either headset 114 or modem 110 to line 118. With headset 114 connected to line 118, direct conversation with the far-end party initiating the telephone call is accommodated. With modem 110 connected to line 118, automated answering machine capabilities of data/fax/voice modem 110 are employed to record an incoming voice message. During automated data communications, including fax communications, headset 114 is disconnected from line 118 and all data is processed through modem 110. These features, and the specific design of emulator circuit 115 are set forth more fully below in the remaining figures. As far as FIG. 2 is concerned, it should be noted that, although FIG. 2 illustrates a separate emulator circuit and a modem, the components may be combined as a single unit. FIG. 2 is provided to illustrate the functionality of the various components and should not be taken to imply any necessary physical configuration. Furthermore, although FIG. 2 illustrates a telephone headset, alternative devices, such as a telephone handset may be employed, and, in general, any acoustic transducer device may be employed to provide the functions of headset 114.

Figure 3:
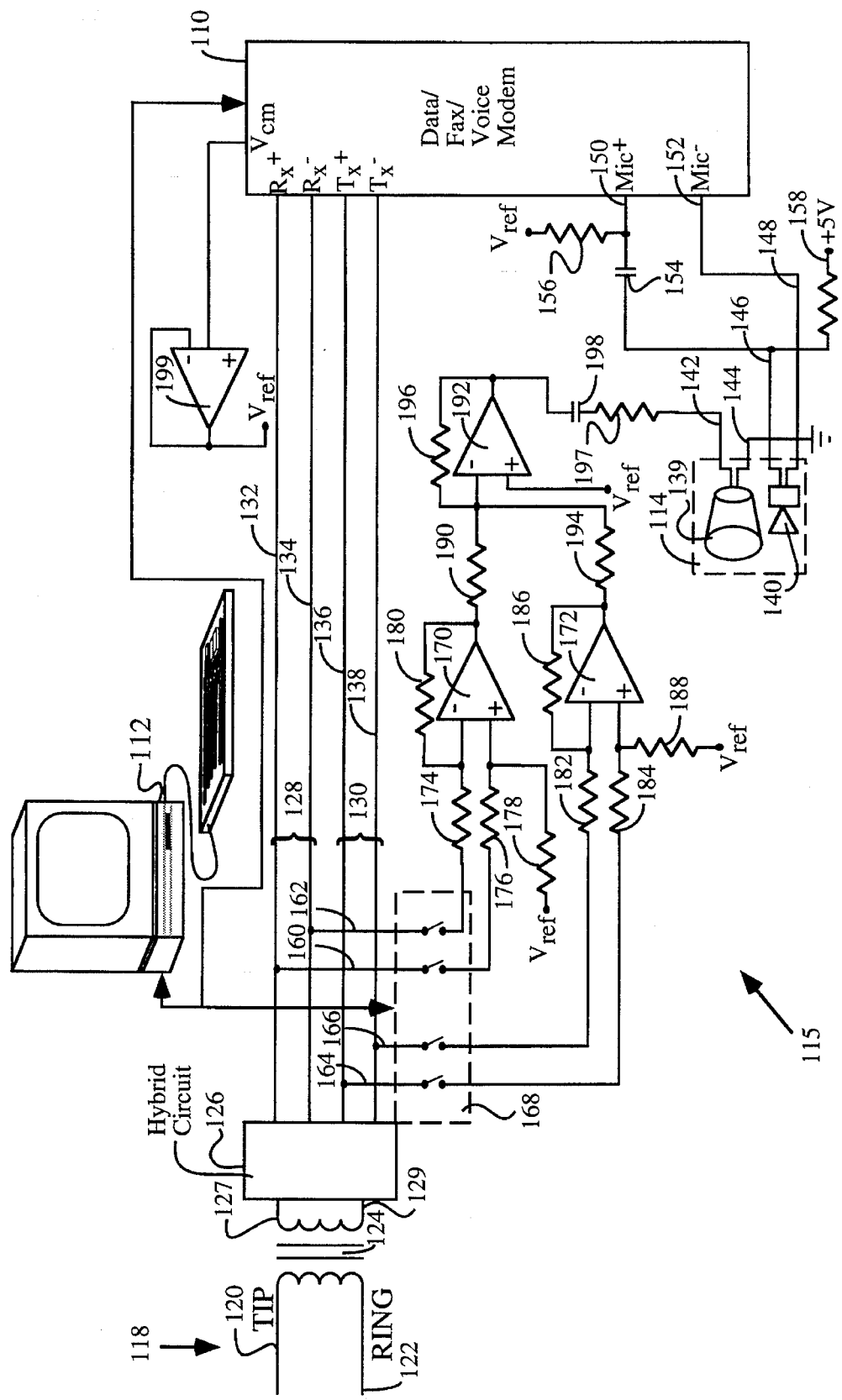
FIG. 3 is a block diagram, partially in schematic form, of an embodiment of the system of FIG. 2, wherein the emulator circuit includes analog components.

Referring now to FIG. 3, a first preferred embodiment of the invention will be described. Telephone line 118 is composed of separate tip and ring lines, 120 and 122 respectively, which are connected through a transformer 124 to a hybrid circuit 126 by lines 127 and 129. Hybrid circuit 126 is connected to modem 110 via a receive line 128 and a transmit line 130. Receive line 128 is composed of a separate $R_x^+$ and $R_x^-$ lines, respectively denoted 132 and 134. Transmit line 130 is composed of separate $T_x^+$ and $T_x^-$ lines, respectively denoted 136 and 138. The four individual lines of the receive and transmit lines 128 and 130 are connected via hybrid circuit 126 to lines 127 and 129 which are connected transformer 124 and vise versa.

Modem 110 is a data/fax/voice modem capable of placing telephone calls by taking line 118 off-hook and initiating a call using either pulse or DTMF dialing. For clarity, not all circuitry required to place telephone calls is illustrated in FIG. 3. Although a variety of conventional modems may be employed, the invention is preferably used in connection with a CL-MD9624 or CL-MD1414 modem provided by Cirrus, Inc., the Assignee of rights to the present invention. The CL-MD9624 modem is provided with the aforementioned $R_x^+$, $R_x^-$, $T_x^+$ and $T_x^-$ ports, as well as a pair of microphone ports Mic$^+$ or Mic$^-$ described below. For modems lacking such ports, some additional circuitry or other modifications may be required.

In FIG. 3, headset 114 is illustrated as having an earphone 139 and a microphone 140. Each is provided with a pair of connection lines. Earphone 139 is connected to input lines 142 and 144. Microphone 140 is connected to output lines 146 and 148. The output lines of microphone 140 are connected to a pair of microphone input ports Mic$^+$ or Mic$^-$ 150 and 152, of modem 110. Line 148 is directly connected to MIC$^-$ port 152. Line 146, is split into two lines, one of which is connected to MIC$^+$ port 150 via a capacitor 154. A resistor 156 is connected from between capacitor 154 and port 150 to a $V_{ref}$ source. The other path of line 146 is connected through a resistor 158 to a +5 volt source. Resistors 158 and 156 and capacitor 154 provide for proper biasing and coupling of the electret microphone 140 to modem 110.

With these interconnections, voices or other sounds picked up by microphone 140 are transmitted into the Mic$^+$ and Mic$^-$ microphone ports of modem 110. Modem 110 includes conventional circuitry for processing the signals received through the microphone inputs, and, in particular, circuitry for routing the signals received through the microphone inputs to the transmit output ports. If modem 110 is provided with an answering machine capability, then circuitry is also provided for recording a greeting received through microphone 140 for use with the answering machine functions. Also, modem 110 is preferably provided with the circuitry for controlling the gain of the signal received through the microphone ports for use in adjusting the level of an output signal generated along transmit lines 130. In this regard, modem 110 may accept conventional commands provided from computer 112 for adjusting the gain. In any case, once a telephone call has been initiated by modem 110, voice signals picked-up by microphone 140 are routed to transmit lines 130 then connected via hybrid 126 and transformer 124 to the tip and ring lines of output line 118 for transmission to the far-end party.

A circuit through which voice signals, received along the tip and ring lines of line 118 from the far-end party, are routed to earphone 139 will now be described with continued reference to FIG. 3. A pair of lines 160 and 162 are tapped into lines 132 and 134 of receive line 128. Likewise, a pair of lines 164 and 166 are tapped into lines 136 and 138, respectively, of transmit line 130. Lines 160 and 162 are also connected through a switch 168 into an amplifier 170 with lines 162 and 160 connected to negative and positive terminals, respectively of amplifier 170. Lines 164 and 166 are connected through switch 168 to a second amplifier 172, with lines 164 and 166 connected to the positive and negative input terminals of amplifier 172 respectively.

Switch 168 is operated under control of host computer 112 or, although not shown, under direct control of modem 110. Switch 168 operates to disconnect earphone 139 from the receive and transmit lines during data or facsimile transmissions. However, during voice transmissions, switch 168 is closed to allow voice messages carried along the receive and transmit lines to be heard through earphone 139. In this regard, both incoming messages from receive line 128 and outgoing messages from transmit line 130 are connected into earphone 139. Thus, an echo or side-tone capability is provided wherein the sounds received by microphone 140 are heard through earphone 139, as with a normal telephone.

Amplifier 170 is interconnected with lines 160 and 162 and a circuit having resistors 174, 176, 178 and 180. As shown, resistor 174 and 176 are connected, along lines 162 and 160 respectively. Resistor 180 is connected in parallel with amplifier 170 between a negative input and an output of the amplifier. Resistor 178 is connected between the positive input of amplifier 170 and a $V_{ref}$ source. Together amplifier 170 and resistors 174, 176, 178 and 180 form a differential-to-single ended converter that senses a received signal on receive line 128 and provides a single output signal having an appropriate voltage gain. The amount of voltage gain is determined by parameters for the resistors and amplifier 170, in accordance with conventional techniques.

Amplifier 172 is interconnected with resistors 182, 184, 186 and 188 to form a second differential-to-single ended converter for sensing a transmitted signal along transmission line 130. Resistors 182 and 184 are connected along lines 166 and 164 respectively. Resistor 186 is connected in parallel with amplifier 172 between a negative input of the amplifier and an output of the amplifier. Resistor 188 is connected between the positive input of the amplifier and a $V_{ref}$ source. As with amplifier 170, amplifier 172 and its associated resistors operate to adjust the voltage gain of signals received along transmit line 130.

The single output of amplifier 170 is connected through a resistor 190 into a negative input of a third amplifier 192. The single output of amplifier 172 is connected through a resistor 194 also into the negative input of amplifier 192. A positive input of amplifier 192 is connected directly to $V_{ref}$. A resistor 196 is connected in parallel between the negative input of amplifier 192 and output of the amplifier. Together, amplifier 192 and resistors 190, 194 and 196 form a summing amplifier that scales and sums signals received from amplifiers 170 and 172 to provide a single signal which includes both the received signal from receive line 128 and the transmit signal from transmit line 130. The single output of amplifier 192 is connected through a capacitor 198 and a resistor 197 into one of the inputs to earphone 139 along line 142. Capacitor 198 provides DC blocking and resistor 197 provides gain adjustment for earphone 139. The second line connected to earphone 139, that is line 144, is connected directly to a ground.

FIG. 3 also illustrates a fourth amplifier 199. A positive input of amplifier 199 is connected into a standard $V_{cm}$ port of modem 110. An output of amplifier 199 is connected to $V_{ref}$. A line interconnects a negative input of amplifier 199 to the output of amplifier 199. Amplifier 199 operates to buffer the common mode voltage, $V_{cm}$, to create a proper DC bias for the overall modem and circuitry.

The various switches, amplifiers, resistors and capacitors connected between earphone 139 and receive and transmit lines 128 and 130 operate to feed a receive and a sidetone signal to the earphone during voice communications. Although the particular combination of circuit components illustrated in FIG. 3 is effective for transmitting the receive and sidetone signals to earphone 139, alternative circuit configurations may also be employed. Furthermore, although switch 168 is shown as switching both the transmit and receive feed lines, the transmit line need not be switched. In other words, switch 168 need not operate on lines 164 and 166. No switching of the transmit line is needed since the input impedance is high enough that no significant loading occurs. However, switching of lines 164 and 166 is preferred since switching prevents data and fax transmission signals from being heard through earphone 138 when the system is operating in a data or fax transmission mode.

In use, when one wishes to place a telephone call, appropriate commands are entered through host computer 112 for entering the telephone number to be dialed. The telephone number may be either entered through a keyboard or selected from a list of previously entered numbers. The telephone number, and various other appropriate control signals are transmitted to modem 110 for initiating a telephone call. Simultaneously, a control signal is sent to switch 168 causing the switch to close for connecting earphone 139 to receive and transmit lines 128 and 130. Modem 110 responds to control signals provided by computer 112 to take telephone line off-hook and place the telephone call using conventional dialing capability. Once the telephone call is connected, voice messages received from the far-end party are heard through earphone 139. The caller responds by speaking into microphone 140. As noted above, the microphone signal is fed through modem 110 and output along transmission line 130, then along telephone 118 to the far end party. During the telephone conversation, data and fax transmission capabilities of modem 110 are not employed. Once the telephone call is completed, the operator enters a command within computer 112 which sends appropriate control signals to modem 110 for placing telephone line 118 on-hook. Simultaneously, switch 168 is opened to disconnect earphone 139 from the receive and transmit lines.

Commands for initiating the telephone call and for ending the telephone call are provided in accordance with conventional programming techniques. In this regard, modem 110 is preferably of the type capable of receiving and processing basic data modem "AT" commands. With such capability, computer 112 is provided with software for transmitting the appropriate "AT" commands to the modem. For modems which do not process conventional "AT", commands, alternative programming may be required. However, such can be provided by those of ordinary skill in the art. The programming of computer 112 and the specific interconnections between switch 168, modem 110 and computer 112 will not be described in further detail.

When an incoming telephone call is received, modem 110 detects the telephone call, takes telephone line 118 off-hook, then determines whether the incoming telephone call contains an automated data or fax message or a regular voice message. If the incoming message is a data or fax message, switch 168 is kept open, and modem 110 processes the incoming data in accordance with conventional techniques. In this regard, modem 110 and host computer 112 may operate to store the data or fax message within a hard disk drive of computer 112. For fax messages, a separate facsimile print-out device may be provided for immediately printing the fax message, without requiring that the fax be stored in a memory device.

For any incoming call, modem 110 provides a ring sound through a speaker, not shown, to notify the operator of the modem that a call is being received. Also, a signal maybe transmitted to switch 168 closing the switch to allow the operator to hear the incoming message. If modem 110 is provided with an answering machine capability, the operator then has a choice to either allow the modem to record a message or to bypass the modem and converse directly with the calling party. Although this feature may be implemented in a number of ways, the system is preferably configured to allow modem 110 to initially answer the telephone call using the answering machine capability. The operator has the option of overriding the answering machine function by entering appropriate commands at computer 112. Once the appropriate commands are entered, a signal is transmitted to modem 110 from computer 112 deactivating the answering machine operation of modem 110. In this manner, the operator can answer the incoming voice message directly or allow the modem to answer the telephone call automatically. Of course, if the operator is not present, no override commands will be entered in the host computer and the modem will automatically operate to record a voice message. In other implementations, the modem can be configured to allow all incoming signals to be heard through the speaker.

Figure 4A:
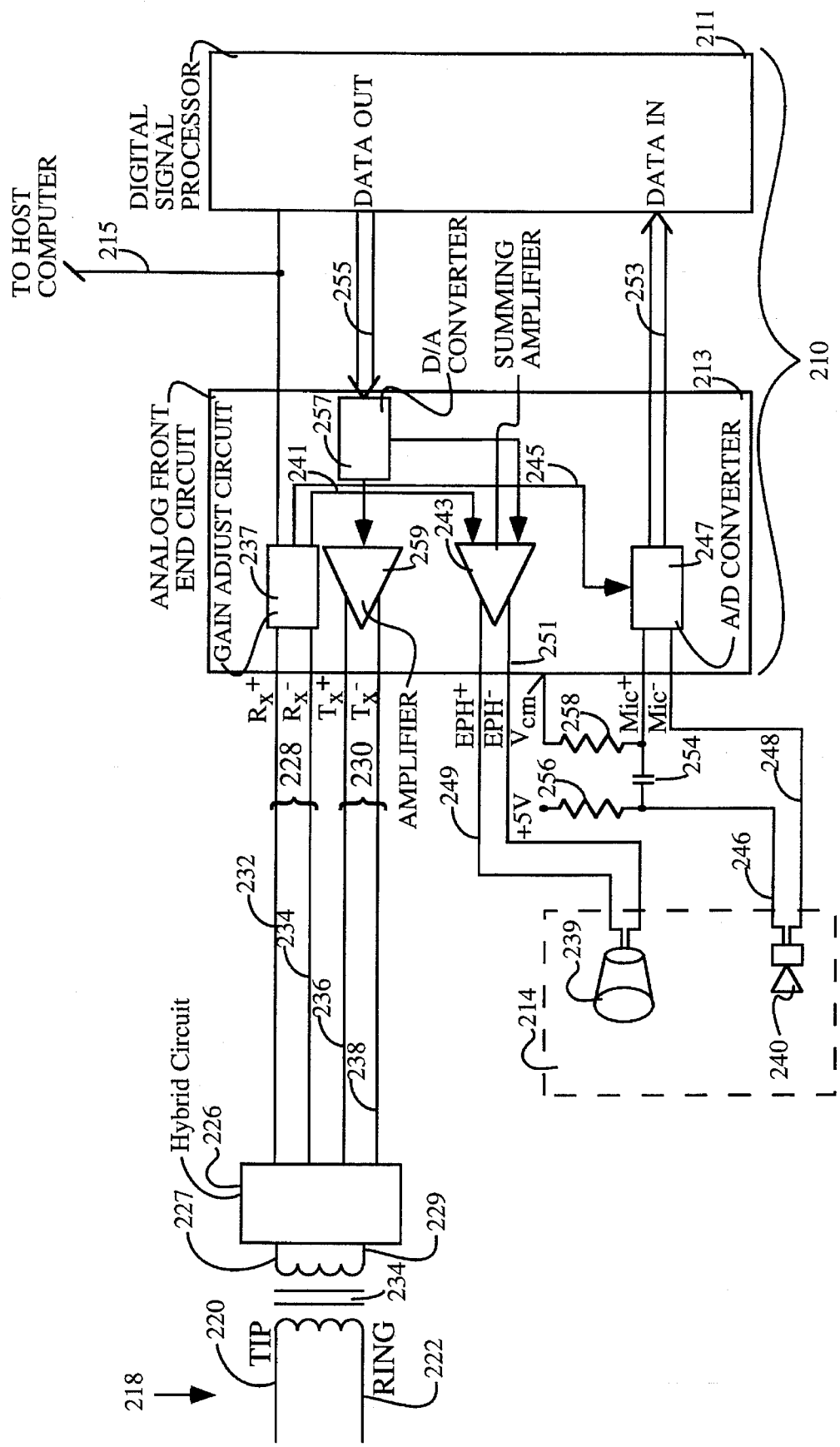
FIG. 4a is a block diagram, partially in schematic form, of an alternative embodiment to the system of FIG. 2, wherein the emulator circuit includes a digital signal processor.

Referring to FIG. 4a, an alternative embodiment to the telephone emulator circuit will now be described. FIG. 4a illustrates a modem 210 having a digital signal processor 211 and a front end circuit 213. Digital signal processor 211 provides for traditional digital modem functions. Front end circuit 213 provides for digital-to-analog and analog-to-digital conversion and also provides circuitry to allowing telephone emulation, i.e., front end 213 performs the functions of emulator circuit 115 of FIG. 3. Front end circuit 213 and digital signal processor 211 are preferably fabricated as separate circuits as shown in FIG. 4, or as a single integrated circuit.

Considering digital signal processor 211 in greater detail, processor 211 performs all the functions of the data/fax/ voice modem 110 of FIG. 3, excluding analog-to-digital and digital-to-analog conversion functions now incorporated within a front end circuit. Although processor 211 may be implemented in a variety of ways, preferably processor 211 is a CL-MD1224, 1024, 1224, 1824, 1214/2614, or 1814/2614 digital signal processing chip or chip set provided by Cirrus Logic, Inc. As with the modem of FIG. 3, processor 211 of FIG. 4a receives commands from a host computer (not shown) along a control line 215. Also, circuitry for interconnecting modem 210 to a telephone line 218 is identical to that of FIG. 3. Namely, telephone line 218 is composed of a separate tip and ring lines 220 and 222, respectively. Tip and ring lines 220 and 222 are connected through a transformer 234 into a hybrid circuit 226 via lines 227 and 229. Hybrid circuit 226 provides two-to-four line conversion for connection to receive and transmit lines 228 and 230. Receive line 228 is composed of separate $R_x^+$ and $R_x^-$ lines 232 and 234, respectively. Transmit line 230 is composed of separate $T_x^+$ and $T_x^-$ lines, 236 and 238, respectively.

Receives line 232 and 234 are connected into a gain adjust circuit 237. Gain adjust circuit 237 also receives control signals from the host computer along control line 215. Gain adjust circuit 237 adjusts the gain of the received signal in response to control signals received from the computer. Gain adjust circuit 237 then outputs the received signal along either a line 241 to a summing amplifier 243 or along a line 245 to an analog-to-digital conversion circuit 247.

Outputs of summing amplifier 243 are connected through ports $EPH^+$ and $EPH^-$ along lines 249 and 251 to an earphone 239. Hence, when received signals are output from gain adjust circuit 237 along line 241, the received signals are then provided to an operator through earphone 239. Thus, for voice telephone calls, the computer controls gain adjust circuit 237 to route the received voice signals to the earphone. For data communications, the computer controls gain adjust circuit 237 to route the received signals along line 245 to the analog-to-digital converter 247. Analog-to-digital converter 247 converts the analog data received along line 245 to digital data for transmission to a data-in port of processor 211 along a bus line 253. Processor 211 processes the digital data in accordance with conventional modem processing techniques for possible storage within a hard disk drive of the computer. For clarity, not all necessary data bus lines between processor 211 and the computer are shown in FIG. 4a. Output data for transmission to telephone line 218, provided by processor 211, is output along a second bus line 255 to front end circuit 213 where the data is converted to analog signals by a digital-to-analog converter 257. Once converted to an analog signal, the data is transmitted to an amplifier 259 which is, in turn, connected to $T_x^+$ and $T_x^-$ lines 236 and 238. In this manner, data provided by processor 211 is converted from digital signals to analog signals and output along transmission line 230 for connection to telephone line 218 through a hybrid circuit 226 and transformer 234.

In addition to receiving input from gain adjust circuit 237, analog-to-digital converter 247 also receives a pair of inputs from a microphone 240. More specifically, two transmission lines 246 and 248 are connected between microphone 240 and analog-to-digital converter 247 through ports $Mic^+$ and $Mic^-$. Line 248 is connected directly into the analog-to-digital converter and provides a $Mic^-$ signal. Line 246 includes a capacitor 254 and a pair of resistors 256 and 258. Resistor 256 is connected between line 246 and a 5-volt source. Resistor 258 is connected between line 246 between capacitor 254 and converter 247, and is connected into a VCM port of front end circuit 213. Conventional VCM circuit interconnections within front end circuit 213 are, for clarity, not shown in FIG. 4a.

In use, voice signals detected by microphone 240 are converted from analog-to-digital by converter 247 then transmitted into processor 211. Processor 211 performs any desired filtering or processing of the voice signal, including gain adjustment, and outputs a digital voice signal along bus line 255. The digital voice signal is converted to analog by converter 257 then amplified onto transmission line 230 for connection to telephone line 218. The outgoing analog voice signal, provided by converter 257, is also output to summing amplifier 243, where the signal is combined with any received signals for output by earphone 239. Thus, both the incoming received signal and the outgoing side-tone voice signal are heard through earphone 239.

In an alternative embodiment, not shown, microphone 240 could be connected directly to amplifier 259 and to summing amplifier 243, rather than being routed through processor 211. In other words, an outgoing voice signal need not be routed through the processor 211. However, as noted above, by converting the outgoing voice signal to digital and transmitting the signal through the digital signal processor, the processor can adjust or filter the outgoing voice signal in a variety of ways under the control of the host computer.

As with the embodiment of FIG. 3, to initiate a telephone call, a desired telephone number is entered or selected using the host computer which sends appropriate control signals to both the processor 211 and front end circuit 213. Processor 211 controls circuitry, not shown, which takes phone line 218 off-hook and dials the selected number. Circuitry for taking the phone line off-hook and initiating the telephone call may be conventional and will not be described in further detail herein.

Received telephone calls are also processed in the same general manner as with the embodiment of FIG. 3. More specifically, when a telephone ring is detected, the system operates to take the telephone line off-hook. If the incoming call is a data or fax message, the system operates to automatically process the incoming message. As noted above, for data or fax messages, gain adjust circuit 237 is controlled to route data directly to the analog-to-digital converter 247 for conversion to digital signals which are subsequently processed by processor 211. A ring sound can be provided through a speaker, not shown, alerting an operator that a call is being is received. Automated answering machine functions of processor 211 then operate to output a greeting and record a message in response thereto. If the operator so chooses, he or she may override the automated answering machine capability and converse directly with the calling party. This is achieved by entering appropriate commands in the host computer which deactivate the answering machine functions of processor 211 and to control gain adjust circuit 237 to route data through summing amp 243 into earphone 239. Alternatively, gain adjust circuit 237 may include a multiplexer which outputs signals to both summing amp 243 and analog-to-digital converter 247. Also, depending upon the implementation telephone calls can be initiated or received by the operator without the answering function being activated.

Thus, the system of FIG. 4a operates to process incoming and outgoing data communications and to also allow for incoming and outgoing conventional telephone communications through a headset. Any software running on the host computer needed to control the digital signal processor may be provided in accordance with conventional software programming techniques. Depending upon the specific digital signal processing chip or chip set used, standard "AT" modem control commands may be employed.

Figure 4B:
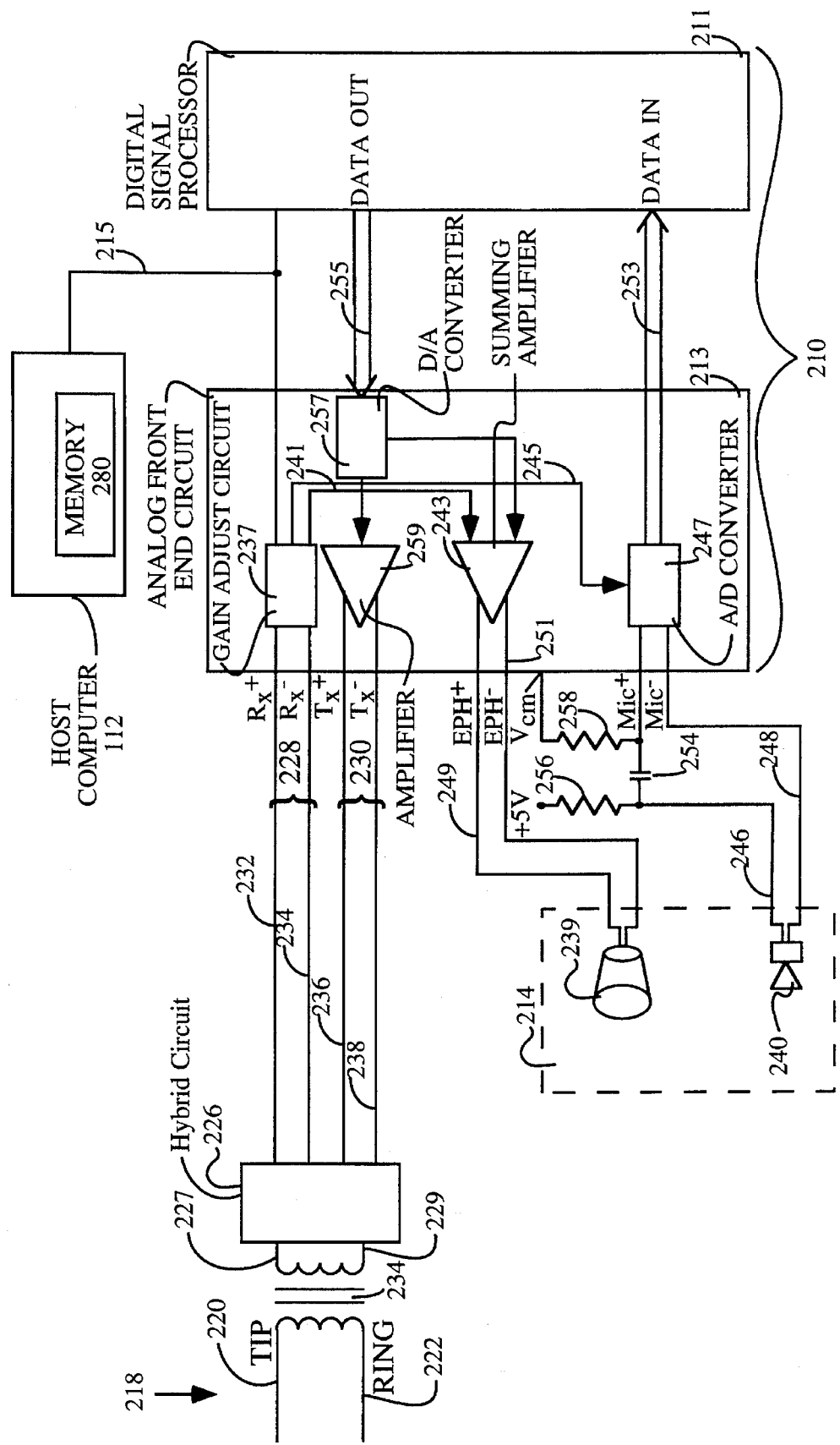
FIG. 4b is a block diagram, partially in schematic form, of an alternative embodiment to the system of FIG. 2 including a memory in a host computer.
Figure 4C:
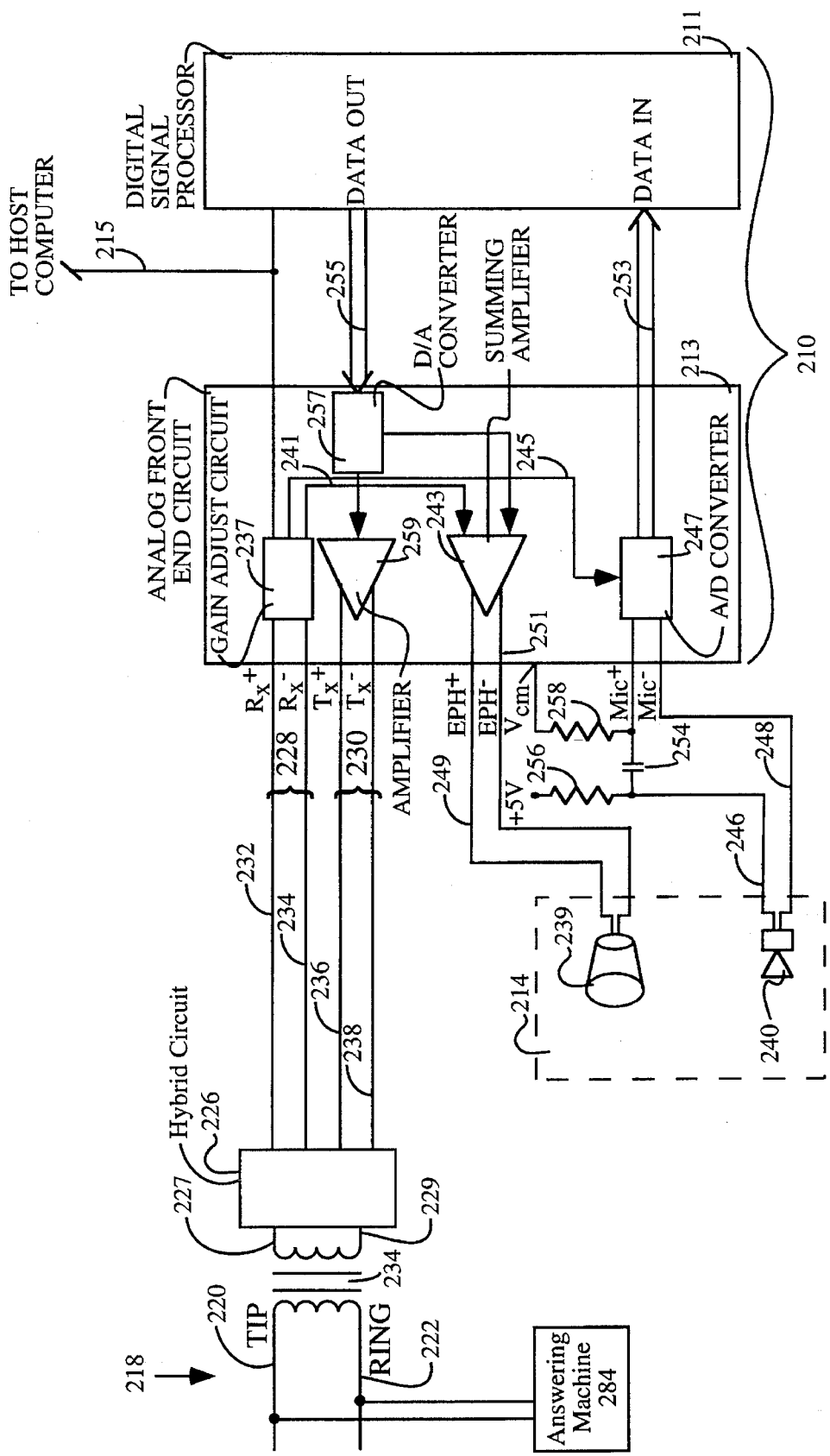
FIG. 4c is a block diagram, partially in schematic form, of an alternative embodiment to the system of FIG. 2 including an answering machine.

FIGS. 4b and 4c illustrate different schemes of storing a prerecorded greeting and of receiving and recording voice messages. FIGS. 4b and 4c are substantially the same as FIG. 4a except for a memory 280 in FIG. 4b and an answering machine 284 in FIG. 4c. In FIG. 4b, a prerecorded greeting and voice messages are stored in memory 280 which resides in host computer 112. In FIG. 4c, a prerecorded greeting and voice messages are stored in a conventional analog recording device, such as answering machine 284 having a tape recorder.

Figure 5:
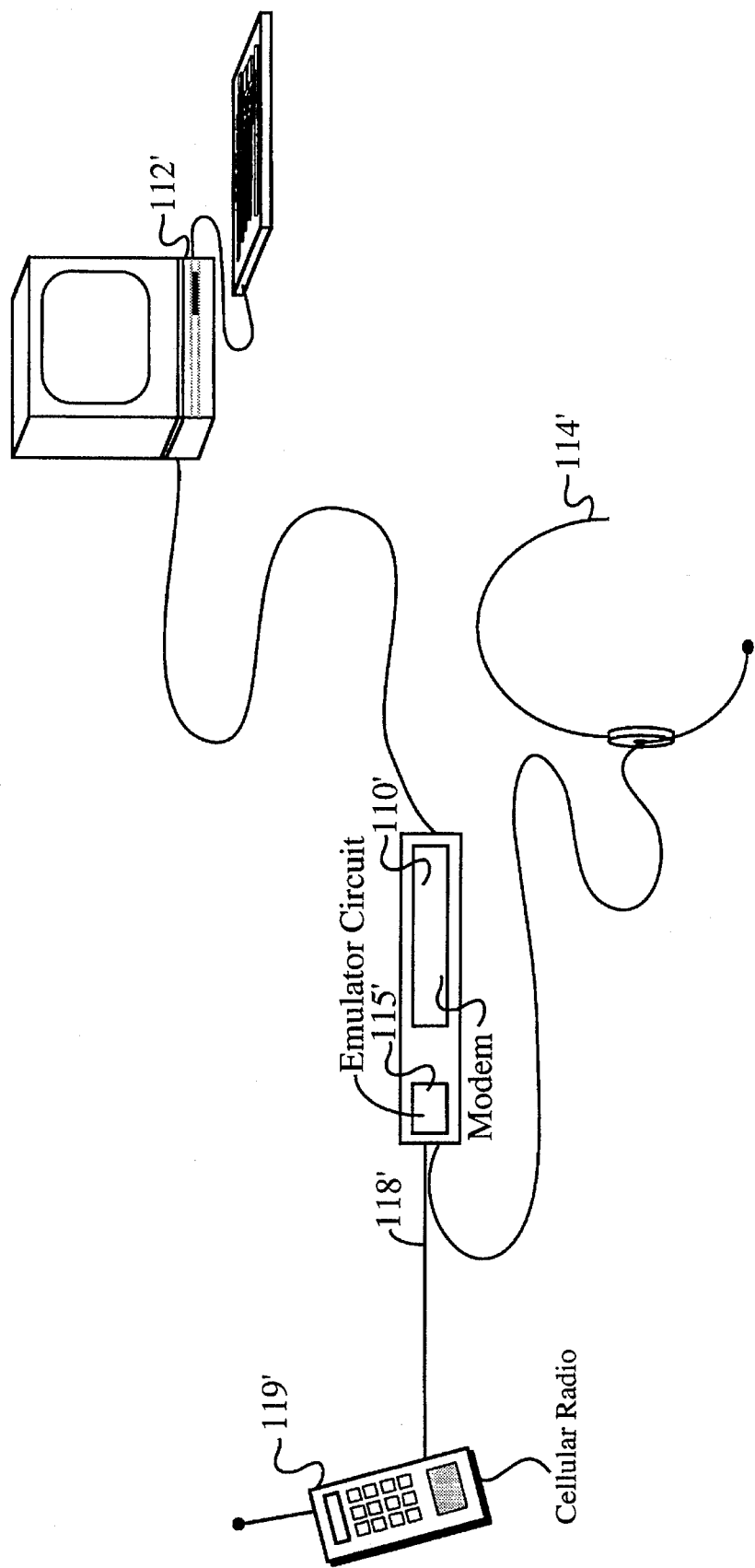
FIG. 5 is a block diagram, partially in schematic form, of an alternative embodiment of the system of FIG. 2 wherein the system is connected to a cellular radio.
Figure 6:
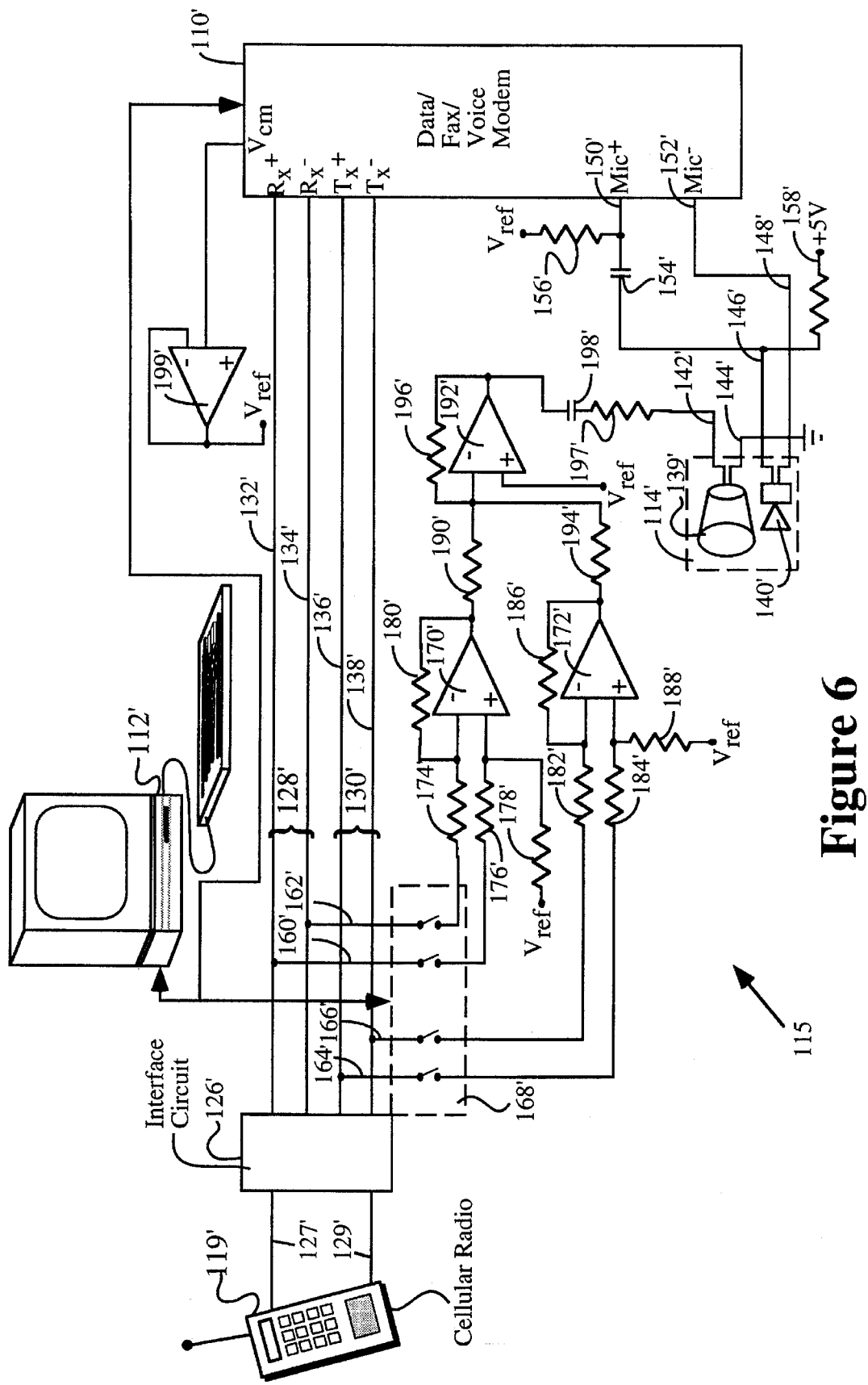
FIG. 6 is a block diagram, partially in schematic form, of an alternative embodiment of the system of FIG. 5, wherein the emulator circuit includes analog components.

Thus FIGS. 2–4c illustrate embodiments of the invention wherein the system is connected to a land-line such as a PSTN telephone line. In FIGS. 5–7 an alternative embodiment of the invention is illustrated wherein the system is connected to a non-land line based communication device such as a cellular radio. The embodiments of FIGS. 5–7 are similar to those of FIGS. 2–4c and like reference numerals are employed with primes. Most of the components of the embodiments of FIGS. 5–7 function in the same manner as those of FIGS. 2–4c and those functions will not be described in detail again. Rather, only relevant differences between the embodiments will be described.

FIG. 5 illustrates a system having a modem 110', an emulator circuit 115' connected through a connection line 118' to a cellular radio 119'. Also illustrated is a computer 112' and a telephone headset 114'. As with the system of FIGS. 2–4c, emulator circuit 115' allows modem 110', computer 112', and telephone headset 114' to emulate the functions of a telephone or similar communications device.

Although FIG. 5 illustrates a cellular radio, as an example of an non-land line based communications device, the system of FIG. 5 may be connected to any non-land line based communication means or modulation means employing any form of transmission media such as infrared, ultraviolet, radio or acoustic waves.

The cellular radio illustrated in FIG. 5 is a conventional cellular radio incorporating telephonic functions, including telephone dialing, repertory dialing, and the like. It should be appreciated that such functions need not be incorporated within cellular radio 119', since the remaining components of FIG. 5 could emulate such telephonic functions. Indeed, cellular radio 119' may include only necessary cellular radio modulation and demodulation components and need not include any telephonic functionality what so ever.

If no telephonic functionality is included within cellular radio 119', then a telephone call is initiated by computer 112' or modem 110'. If telephonic functionality is included within cellular radio 119', then a telephone call can also be initiated directly by cellular radio 119'. As with the embodiment of FIGS. 2–4a above, once a telephone call is established, outgoing messages are received either through a microphone of headset 114' or are generated by modem 110' depending upon whether the telephone call is intended to provide a digital message such as a fax or data message, or a voice message such as a direct spoken message. Responsive incoming messages received through cellular radio 119' are either routed to an earphone of headset 114', if the telephone call is a direct voice telephone call or routed into modem 110' if the telephone call is a fax or data communication.

For a telephone communication initiated by a far-end party, modem 110' operates in the same manner as the modem of FIGS. 2–4c to determine whether the incoming message contains voice, fax or data communications and then to route the message to computer system to 112' or to telephone headset 114' as appropriate. Also, as with the embodiments described above, for a voice message initiated by a far end party, modem 110' initially activates an internal answering machine capability to directly answer the voice message, unless overridden by an operator who wishes to speak directly with the far-end calling party.

FIG. 6 illustrates an embodiment of the system of FIG. 5 wherein emulator circuit 115 is configured using analog components mounted externally to modem 110'. Most components of the embodiment of FIG. 6 operate in the same manner of those of FIG. 3 and such operation will not be described in detail again. However, certain differences are worth noting. In the embodiment of FIG. 6, receive and transmit lines 128' and 130' are connected between modem 110' and interface circuit 126'. Cellular radio 119' is connected to interface circuit 126' along receive and transmit lines 127' and 129', respectively. Interface circuit 126' includes circuitry for converting signals received from cellular radio 119' on line 127' to receive signals appropriate to modem 110' along lines 128'. Likewise, interface circuit 126' includes circuitry for converting transmission signals output from modem 110' along transmission lines 130' to transmission signals appropriate for input to cellular radio 119' along line 129'.

In the embodiments described above, modem 110 operated to take telephone line 118 on-hook or off-hook as appropriate. It should be noted that modem 110' may require a somewhat different configuration or different programming to generate necessary signals for initiating or terminating communications through cellular radio 119' in accordance with specific input signals required or expected by cellular radio 119'. Additionally, modem 110' may generate further signals for controlling cellular radio 119' including signals for activating or deactivating the radio. For example, in certain implementations, it may be desirable to maintain cellular radio 119' in a low-power consuming state while communications are not being transmitted to conserve battery power. As such, modem 110' preferably generates signals necessary for "powering up" cellular radio 119' prior to initiating communications and for "powering down" cellular radio 119' after communications have terminated.

FIG. 7 illustrates an alternative embodiment of the system wherein a digital emulator circuit is provided as a portion of modem 210' in connection with a digital signal processor 211'. The embodiment of FIG. 7 operates generally in the same manner as that of FIG. 4a with the same differences as noted above with respect to FIG. 6.

FIG. 8 illustrates an interface circuit for use as interface circuit 126' of the embodiment of FIG. 6 or interface circuit 226' of the embodiment of FIG. 7. The interface circuit includes three amplifiers 302, 304 and 306, along with resistors 308–328 and capacitors 330–334, connected as shown. Amplifier 302 is connected between transmission lines 136' and 138' and transmission line 127'. Amplifier 302 operates to convert positive and negative transmission signals received along lines 136' and 138' to a single transmission signal for output to cellular radio 119' (FIG. 6) along line 127'. Amplifiers 304 and 306 are connected between receive line 129' and receives lines 132' and 134'. Amplifiers 304 and 306, in combination with the various resistors and capacitors illustrated, operate to convert the single line receive signal received from cellular radio 119' (FIG. 6) along line 129' to a pair of positive and negative receive signals for input into modem 110' (FIG. 6) along lines 132' and 134'.

As can be appreciated, the details of interface circuit 126' may vary according to the specific configuration of cellular radio 119' and may further vary if cellular radio 119' is replaced with another communication device such as an infrared, ultraviolet or acoustic wave based modulation or demodulation means.

The foregoing figures illustrate embodiments wherein a modem is connected to either a land-line or to a cellular radio or similar non-land-line device. FIG. 9 illustrates an interface circuit 426 for use in connecting a modem to either a telephone line or to a cellular radio or a similar device. More specifically, interface circuit 426 interconnects positive and negative receive and transmit lines 132', 134', 136' and 138' to tip and ring lines 120 and 122 and to cellular radio transmit and receive lines 127' and 129'. A switch 427 is provided along receive and transmit lines 132'–138' for connecting the receive and transmit lines either to circuitry connected to tip and ring lines 120 and 122 or to separate circuitry connected to cellular radio transmit and receive lines 127' and 129'. A switch control device 429 controls the operation of switch 427. Although not shown, switch control 429 may be connected to a manual switch for allowing a user to switch between telephone line operation or cellular radio operation. Alternatively, switch control 429 may be connected to the modem or to the computer to allow for automated switching. The method or mechanism by which switch control 429 is connected to a manual switch or the modem or computer may be provided in accordance with conventional switching techniques and such techniques will not be described in detail herein.

As noted, one circuit is provided for connecting receive and transmit lines 132'–138' to tip and ring lines 120 and 122, whereas a second circuit is provided for connecting receive and transmit lines 132'–138' to cellular radio receive and transmit lines 127' and 129'. Specific circuit elements interconnected to tip and ring lines 120 and 122 include capacitors 431 and 433, and resistors 435, 436, 438, 440, 442, 444 and 446, interconnected as shown. The foregoing elements operate to combine the four separate receive and transmit lines 132'–138' into a single input to a transformer 448 which is connected directly to tip and ring lines 120 and 122. A ring detector 450 may be connected directly to tip and ring lines 120 and 122 for detecting an incoming ring signal. Preferably, ring detector 450 is separately connected to the modem (described above). It should be noted that the circuit elements shown interconnecting receive and transmit lines 132'–138' and tip and ring lines 120 and 122 may be utilized in the embodiments of FIG. 3 as hybrid circuit 126.

The circuit element components interconnecting receive and transmit lines 132'–138' and cellular radio receive and transmit lines 127' and 129' are simular or identical to those illustrated in FIG. 8. More specifically, the circuit includes amplifiers 402, 404 and 406, resistors 408, 410, 412, 414, 416, 418, 420, 422, 424, 426 and 428, and capacitors 430, 432 and 434 and interconnected as shown.

In use, before an outgoing transmission is initiated, a user selects whether the transmission is to be sent out along the telephone line or through the cellular radio. The operator then controls switch 427 appropriately to select to the desired communication device. Then the operator initiates the telephone call in the manner as described above. For incoming messages the system determines whether the messages are received along the tip and ring lines or the cellular radio then controls switch 429 to automatically connect lines 132$^1$–138$^1$ to tip and ring lines 120 and 122 or to cellular radio lines 127' and 129'. In one embodiment, the operator merely detects the incoming call from a ring generated either by the cellular radio or by ring detector 450 them manually controls switch 427 to connect the modem to the appropriate lines. Alternatively, switch 427 is controlled automatically, following the detection of an incoming telephone call. In such embodiment, ring detector 450 is interconnected directly to the modem or the computer for automated detection of a ring signal. For an incoming cellular radio communication, a separate line may need to be connected between the cellular radio or the modem or computer. Alternatively, the system is configured to remain connected to the cellular radio as a default input device with switch 427 only being switched to receive signals from tip and ring lines 120 and 122 upon the connection of a ring via ring detector 450. In this manner, a separate detection line need not be provided between the cellular radio and the modem or computer for detecting an incoming cellular radio communication.

As can be appreciated, the specific manner by which incoming telephone or cellular radio messages are detected and the manner by which 427 is controlled may vary according to specific applications and implementation, and such details will not be provided herein.

What has been described is a system for allowing a modem, telephone headset, and host computer to emulate a telephone such that a separate telephone is not required. In a first embodiment, the system is connected to a land-based telephone line connected to the PSTN. In a second embodiment, the system is connected to a non-land line based communication device, such as a cellular radio. Although described with respect to certain exemplary embodiments, those embodiments are merely illustrative of the invention, and should not be taken as limiting the scope of the invention. Rather principles of the invention can be applied to numerous specific systems and embodiments. In particular, the non-land line based embodiments of the invention may be applied to communication devices or modulation/demodulation means utilizing any form of non-land line based transmission media, including radio, infrared, ultraviolet and acoustic waves. As an example, the system may be utilized in connection with in office infrared based local area network devices. In its various embodiments, the system allows full telephone emulation using only the telephone headset, modem and host computer. The system thus provides a simple and cost effective technique for emulating a telephone whereby a separate telephone is not required.

What is claimed is:

1. An apparatus for connecting to a communication device, said apparatus comprising:

modem means for receiving information from and for transmitting information to said communication device;

acoustic transducer means for receiving and producing sounds; and connection means for connecting said modem means to said communication device for automated communication and connecting said acoustic transducer means to said communication device for non-automated voice communication, wherein said connection means connects said modem means to said communication device if an incoming message is a data message and connects one of said modem means and said acoustic transducer means to said communication device if said incoming message is a voice message, wherein said acoustic transducer means includes an earphone and a microphone, wherein said modem means has receive, transmit and microphone terminals and wherein said connection means includes:

means for connecting said receive and transmit terminals of said modem means to said communication device;

earphone connection means for connecting said earphone of said acoustic transducer means to said transmit terminal of said modem means and for selectively connecting said earphone to said receive terminal of said modem means; and microphone connection means for connecting said microphone of said acoustic transducer means to said microphone terminal of said modem means, wherein said means for connecting said receive and transmit terminals of said modem means includes a receive line connected to said receive terminal and a transmit line connected to said transmit terminal, said receive and transmit lines each include a pair of lines and wherein said earphone connection means comprises:

first differential detection means for detecting a difference between signals of said pair of lines of said transmit line;

second differential detection means, connected through a switch to said receive line, for detecting a difference between signals of said pair of lines of said receive line; and summing means for combining outputs of said first and second differential detection means;

with said earphone being connected to an output of said summing means.

2. The apparatus of claim 1, wherein said modem means is a data/fax/voice modem, and wherein said communication device is one of a cellular radio and a telephone line.

3. An apparatus for connecting to a communication device, said apparatus comprising:

modem means for receiving information from and for transmitting information to said communication device;

acoustic transducer means for receiving and producing sounds; and connection means for connecting said modem means to said communication device for automated communication and connecting said acoustic transducer means to said communication device for non-automated voice communication, wherein said connection means connects said modem means to said communication device if an incoming message is a data message and connects one of said modem means and said acoustic transducer means to said communication device if said incoming message is a voice message, wherein said acoustic transducer means includes an earphone and a microphone, wherein said modem means has receive, transmit and microphone terminals and wherein said connection means includes:

means for connecting said receive and transmit terminals of said modem means to said communication device;

earphone connection means for connecting said earphone of said acoustic transducer means to said transmit terminal of said modem means and for selectively connecting said earphone to said receive terminal of said modem means; and microphone connection means for connecting said microphone of said acoustic transducer means to said microphone terminal of said modem means, wherein said means for connecting said receive and transmit terminals of said modem means includes a receive line connected to said receive terminal and a transmit line connected to said transmit terminal, said receive and transmit lines each include first and second lines and wherein said earphone connection means comprises:

a first operational amplifier having first and second inputs connected to said first and second lines, respectively, of said transmit line;

a second operational amplifier having first and second inputs connected through a switch to said first and second lines, respectively, of said receive line; and a third operational amplifier having a first input connected to outputs of said first and second operational amplifiers and having a second input connected to a reference voltage;

with said earphone being connected to an output of said third operational amplifier.

4. The apparatus of claim 3, wherein said modem means is a data/fax/voice modem, and wherein said communication device is one of a cellular radio and a telephone line.

5. An apparatus for connecting to a communication device, said apparatus comprising:

a modem including a receive line for receiving information from said communication device and a transmit line for transmitting information to said communication device;

switching means for connecting said receive and transmit lines to said communication device, wherein said communication device is one of a cellular radio and a telephone line;

an acoustic transducer device for receiving and producing sounds;

an interface circuit having:

a first amplifier for connecting said transmit line to said cellular radio, and for converting positive and negative transmission signals received along said transmit line to a single transmission signal for output to said cellular radio; and second and third amplifiers for connecting said cellular radio to said receive line, and for converting a single signal received from said cellular radio to a pair of positive and negative receive signals for said receive line; and a connection circuit including:

a first amplifier for receiving signals from said transmit line;

a second amplifier for receiving signals from said receive line; and a third amplifier for receiving outputs from said first and second amplifiers, an output of said third amplifier being received by said acoustic transducer device.

6. The apparatus of claim 5, wherein said modem is a data/fax/voice modem; and said acoustic transducer device includes a microphone and an earphone.

7. An apparatus for connecting to a communication device, said apparatus comprising:

a modem including a receiving line for receiving information from said communication device and a transmit line for transmitting information to said communication device, said receive and transmit lines each including separate tip and ring lines;

an acoustic transducer device for receiving and producing sounds; and a connection circuit including:
  a first amplifier for receiving signals from said transmit line, said first amplifier having first and second input nodes connected through a switch to said tip and ring lines, respectively, of said transmit line;
  a second amplifier for receiving signals from said receive line, said second amplifier having first and second input nodes connected through a switch to said tip and ring lines, respectively, of said receive line; and
  a third amplifier for receiving outputs from said first and second amplifiers, an output of said third amplifier being received by said acoustic transducer device, said third amplifier having a first input node connected to outputs of said first and second amplifiers and have a second input node connected to a reference voltage; and wherein said first, second and third amplifiers are differential amplifiers.

8. An apparatus for connecting to a communication device, said apparatus comprising:
  modem means including a receive line for receiving information from said communication device and a transmit line for transmitting information to said communication device, said receive and transmit lines each including separate tip and ring lines;
  acoustic transducer means for receiving and producing sounds; and
  connection means including:
    a detection circuit for detecting first signals on said transmit line and second signals on said receive line and for producing outputs, said detection circuit including:
      first differential means for detecting a difference between said first signals and for producing a first one of said outputs, wherein said first differential means detects and amplifies a difference between said first signals of said tip and ring lines of said transmit line; and
      second differential means for detecting a difference between said second signals and for producing a second one of said outputs, wherein said second differential means detects and amplifies a difference between said second signals of said tip and ring lines of said receive line;
      wherein said first differential means is coupled to said tip and ring lines of said transmit line through a switch; and
      wherein said second differential means is coupled to said tip and ring lines of said receive line through a switch; and
    a summation circuit for combining said outputs, an output of said summation circuit being received by said acoustic transducer means.

9. The apparatus of claim 8, wherein said modem means includes
  means for receiving a data message;
  means for receiving a facsimile message; and
  means for receiving a voice message.

10. The apparatus of claim 8, wherein said modem means is a data/fax/voice modem.

11. The apparatus of claim 8, wherein said modem means includes means for automatically receiving and processing voice messages received from said communication device.

12. The apparatus of claim 11, wherein said means for automatically receiving and processing a voice message includes answering machine means for transmitting a pre-recorded greeting to said communication device and for recording a responsive message received from said communication device.

13. The apparatus of claim 8, wherein said acoustic transducer means is a telephone headset.

14. The apparatus of claim 8, wherein said connection means connects said modem means to said communication device if an incoming message is a data message and connects one of said modem means and said acoustic transducer means to said communication device if said incoming message is a voice message.

15. The apparatus of claim 14, wherein said acoustic transducer means includes an earphone and a microphone, wherein said modem means has receive, transmit and microphone terminals and wherein said connection means includes
  means for connecting said receive and transmit terminals of said modem means to said communication device;
  earphone connection means for connecting said earphone of said acoustic transducer means to said transmit terminal of said modem means and for selectively connecting said earphone to said receive terminal of said modem means; and
  microphone connection means for connecting said microphone of said acoustic transducer means to said microphone terminal of said modem means.

16. The apparatus of claim 15, wherein said communication device has separate receive and transmit terminals and wherein said means for connecting said receive and transmit terminals of said modem means comprises
  an interface circuit having a first pair of receive and transmit terminals connected to said receive and transmit terminals of said communication device;
  a receive line interconnecting said receive terminal of said modem means and a second receive terminal of said interface circuit; and
  a transmit line interconnecting said transmit terminal of said modem means and a second transmit terminal of said interface circuit.

17. The apparatus of claim 15, further including a means for buffering a common mode voltage of said modem means.

18. A method for processing communication messages using a modem, an acoustic transducer device, and a connection circuit, said connection circuit including a detection circuit and a summation circuit, said summation circuit coupled to said detection circuit and said acoustic transducer device, said modem including a transmit line for transmitting information to a communication device and a receive line for receiving information from said communication device, said transmit and receive lines each including separate tip and ring lines, said detection circuit including a first and a second differential amplifier, and said summation circuit including a third differential amplifier; said method comprising the steps of:
  detecting an incoming message;
  determining whether said incoming message contains a voice message or a data message;
  selectively connecting said acoustic transducer device to said communication device using said connection circuit, if said incoming message is a voice message, said step of selectively connecting said acoustic transducer device including the steps of:
    detecting first signals from said transmit and receive lines, said step of detecting said first signals including the step of routing said first signals to said detection circuit which detects said first signals, wherein said step of routing said first signals includes the steps of:
routing signals from said tip and ring lines of said transmit line to said first differential amplifier; and
routing signals from said tip and ring lines of said receive line to said second differential amplifier;
producing first output signals from said first signals;
summing said first output signals, said step of summing said first output signals includes the step of routing said first output signals to said summation circuit which combines said first output signals, wherein said step of routing said first output signals includes the step of: routing said first output signals to said third differential amplifier;
producing a second output signal from said first output signals; and
routing said second output signal to said acoustic transducer device; and
selectively connecting said modem to said communication device, if said incoming message is a data message.

19. A method for processing communication messages using a modem, an acoustic transducer device, and a connection circuit, said modem including a transmit line for transmitting information to a communication device and a receive line for receiving information from said communication device, said transmit and receive lines each including separate tip and ring lines, said method comprising the steps of:
detecting an incoming message;
determining whether said incoming message contains a voice message or a data message;
selectively connecting said acoustic transducer device to said communication device using said connection circuit, if said incoming message is a voice message, said step of selectively connecting said acoustic transducer device including the steps of:
detecting first signals from said transmit and receive lines;
producing first output signals from said first signals, wherein said steps of detecting said first signals and producing said first output signals include the steps of:
detecting a difference between third signals of said tip and ring lines of said transmit line to produce a first one of said first output signals;
detecting a difference between fourth signals of said tip and ring lines of said receive line to produce a second one of said first output signals;
summing said first output signals;
producing a second output signal from said first output signals; and
routing said second output signal to said acoustic transducer device; and
selectively connecting said modem to said communication device, if said incoming message is a data message.

20. An apparatus for connecting to a communication device, said apparatus comprising:
a modem for receiving information from and for transmitting information to said communication device, said communication device including receive and transmit lines, said modem including a processor for processing signals, said processor having an input and an output;
an acoustic transducer for receiving and producing sounds; and
a connection circuit including:
gain adjustment means, connected to said receive line, for controlling the gain of signals received along the receive line;
summing means, having a first input connected to an output of said gain adjustment means for receiving a first input signal and a second input for receiving a second input signal from a microphone means, said summing means for summing said first and second input signals and applying said summed signals to said acoustic transducer, said microphone means coupled to said transmit line;
analog-to-digital conversion means, having a first input connected to said microphone means and a second input connected to an output of said gain adjustment means, for converting signals from analog-to-digital, said analog-to-digital conversion means having an output connected to said input of said processor;
digital-to-analog conversion means having an input connected to the output of said processor for converting digital signals from said processor to analog signals; and
amplification means for amplifying a signal output from said digital-to-analog conversion means and applying said signal to said transmit line,
wherein said second input of said summing means is connected to an output of said digital-to-analog conversion means, and
wherein said microphone means is coupled to said transmit line through said analog-to-digital conversion means, said processor, said digital-to-analog conversion means, and said amplification means.

21. A method for processing communication messages using a modem, a microphone/earphone set, and a communication device, wherein said communication device is connected to separate receive and transmit lines, said modem includes a processor, said method comprising the steps of:
detecting an incoming message;
determining whether said incoming message contains a voice message or a data message;
selectively connecting said microphone/earphone set to said communication device, if said incoming message is a voice message; and
selectively connecting said modem to said communication device, if said incoming message is a data message;
wherein said step of selectively connecting said microphone/earphone set to said communication device includes the steps of:
routing signals output from a microphone of said microphones/earphone set to said transmit line, said step of routing signals output from said microphone of said microphone/earphone set to said transmit line including the steps of:
routing said signals output from said microphone through an analog-to-digital converter;
routing signals output from said analog-to-digital converter through said processor;
routing signals output from said processor through a digital-to-analog converter;
routing signals output from said digital-to-analog converter onto said transmit line through an amplifier;
routing signals carried on said receive line through a gain adjustment circuit;
routing signals output from said gain adjustment circuit and said signals output from said microphone through a summing amplifier which outputs a signal in representative of a combination of said signals output from said gain adjustment circuit and said microphone; and routing the output of said summing amplifier into an earphone of said microphone/earphone set.

* * * * *

UNITED STATES PATENT AND TRADEMARK OFFICE
CERTIFICATE OF CORRECTION

PATENT NO. : 5,524,047
DATED : June 4, 1996
INVENTOR(S) : Brown et al.

It is certified that error appears in the above-identified patent and that said Letters Patent is hereby corrected as shown below:

In column 11 at line 54, please delete " 2-4a " and insert -- 2-4c --.

Signed and Sealed this

Fourth Day of February, 1997

Attest:

BRUCE LEHMAN

Attesting Officer

Commissioner of Patents and Trademarks